Patented June 21, 1938

2,121,305

UNITED STATES PATENT OFFICE 2,121,305

MANUFACTURE OF EMULSIONS

Hans Schrader and Herbert Stahl, Essen-Ruhr, Germany, assignors to Th. Goldschmidt Aktiengesellschaft, Essen-on-the-Ruhr, Germany, a corporation of Germany No Drawing. Application September 8, 1936, Serial No. 99,863. In Germany September 26, 1935

14 Claims. (Cl. 252—1)

This invention relates to manufacture of emulsions: and it comprises a method of producing emulsions wherein a material to be emulsified is dispersed in an aqueous medium by means of two substances acting conjointly as emulsifiers, one of said substances being a polyhydric alcohol partially esterified with a saturated or unsaturated high-molecular fatty acid or with a derivative or substitution product of such an acid, and the other of said substances being a reaction product of (1) a high molecular acid- or alkaline-decomposition product of an albumin, with (2) a higher saturated or unsaturated fatty acid, or with a substitution product or derivative of such a fatty acid; and it also comprises the emulsions produced by the described method, said emulsions being characterized by great stability with respect to dilution, to the addition of salts, to heating, to cooling, and to change of pH, and being substantially inert physiologically; all as more fully hereinafter set forth and as claimed.

While a large number of emulsifiers have been described in the art, the number of these substances is rather limited which are adapted to be used for the production of oleaginous emulsions, such as those used in cosmetics and foodstuffs, for example. It has here-to-fore been proposed to employ the partially esterified polyhydric alcohols as emulsifiers and one of us (Schrader, U. S. Patent No. 1,826,900) has described the use of these substances as emulsifiers in conjunction with small amounts of alkaline substances such as soap. These alkaline substances greatly enhance the emulsifying power of the partially esterified polyhydric alcohols and in this manner commercially important emulsions having an alkaline reaction can be produced. It is also known that the emulsifying power of the partially esterified polyhydric alcohols can be enhanced by the presence of small amounts of acylated alkylene diamines or their derivatives; see the German Patent No. 545,763. By means of this combination of emulsifiers it is possible to produce emulsions of acid reaction.

We have now found that another type of known emulsifiers, in combination with the partially esterified polyhydric alcohols, are capable of producing emulsions of either acid or alkaline reaction, these emulsions having greatly improved stability and physiological inertness. These emulsifiers are fatty acid amino compounds and may be formed from the high-molecular acid- or alkaline-decomposition products of albumins by reacting the same with the higher saturated or unsaturated fatty acids or their substitution products or derivatives. The albumins which are useful in producing the desired compounds include egg-albumin, serum-albumin, lact-albumin as well as gelatine, casein, the albumin derived from horn and the like. Albumins in general of either animal or vegetable origin are applicable. An acid- or an alkali-decomposition product of such an albumin is reacted at ordinary or elevated temperature with a high-molecular fatty acid body, in which the acid group is the chief function, i. e. the most reactive group present in the molecule. The term "fatty acid body" includes the higher fatty acids or their derivatives or substitution products. The acid chlorides or anhydrides of the higher fatty acids are particularly applicable. The reaction is advantageously conducted in the presence of sufficient added alkali to produce an alkaline reaction throughout the course of the process. The reaction products obtained are clear, oily or pasty substances forming limpid solutions with water.

One cheap source of albumin which we have used is the waste from chrome leather. This can be readily decomposed by alkali; that is, by a mild alkaline treatment to form a concentrated liquor containing the salts of protalbinic and lysalbinic acids (as shown by Ullmann, in his "Enzyklopädie der Technischen Chemie", second edition, vol. 7, page 413). This liquor reacts readily with the acid chlorides of the higher fatty acids, for example, to produce the emulsifiers in question. A liquor of this nature, which may contain roughly 50 per cent solids, can be placed in a reaction vessel and the acid chloride of oleic acid added in a thin stream during vigorous agitation. Sufficient alkali may be added to insure solution. The reaction product—a fatty acid amino compound —can be recovered by evaporation of the water and then may be purified by various methods. A small amount of the resulting fatty acid amino reaction product, in conjunction with a partially esterified polyhydric alcohol, is capable of producing aqueous emulsions of all types of oleaginous substances, these emulsions being usually of the oil-in-water type and being characterized by their high stability.

The emulsions produced in accordance with the processes of the present invention are obviously capable of manifold uses. They may be used in the textile industry, and as cosmetics and polishing agents. These emulsions find many uses in the leather industry, in the mineral oil industry, in the food industry and they can be used in many pharmaceuticals. They can also be used in soaps and margarines. In fact our emulsions can be employed in place of any of the oleaginous emulsions now in commercial use.

The advantages of the emulsions produced in accordance with the present invention are important. Liquid or pasty emulsions can be produced in which the aqueous phase forms by far the larger part of the whole. These emulsions can be of acid, neutral or alkaline reaction. The stability of these emulsions upon change of temperature, upon the addition of various electrolytes and upon dilution is substantially greater than that of known emulsions of somewhat similar character. The physiological indifference or inertness of these emulsions is also remarkable.

The following specific examples, which represent practical embodiments, illustrate how our processes can be applied in practice to produce emulsions of new and favorable properties within the purview of the present invention. These examples further illustrate the important advantages to be gained by use of the present invention, in comparison with prior methods of making emulsions.

*Example 1.*—We mixed together 9 parts by weight of a technical glycerine mono stearic acid ester, 3 parts of a 25 per cent solution of an oleic acid amino substance, prepared as described above, and 88 parts of water, at a temperature of about 70° C. This mixture readily formed an emulsion. Stirring was continued until the emulsion had cooled. The resulting emulsion was found to be thinly liquid and stable even at 50° C. It could be diluted, without separating, with water having a hardness of 20 degrees, in amount up to 10 to 20 times its weight.

In order to compare the above emulsion with a similar emulsion prepared in accordance with the Schrader Patent No. 1,826,900, we mixed together 9 parts by weight of the same glycerine mono stearic acid ester, 0.6 part of potassium stearate and 90 parts of water. This Schrader emulsion was a thick salve-like product which, when diluted with 10 to 20 parts of the same hard water, was found to separate, a flaky material precipitating.

A further comparison was made with an emulsion prepared in accordance with the German Patent No. 545,763. In preparing this emulsion we mixed together 9 parts by weight of the same technical glycerine mono stearic acid ester, 0.4 part by weight of diethyl aminoethyloleylamide chloride and 90 parts of water. The resulting emulsion was found to be salve-like but, when diluted with 10 times its weight of the same hard water, it separated, a flaky material precipitating from the liquid.

The three emulsions, prepared as above, were also compared as to their stability upon the addition of alkali. This test was conducted by the addition of 200 parts of lime water to 100 parts of each of the three emulsions. It was found that the emulsion prepared in accordance with the present invention remained stable upon this addition while the other two emulsions separated. Of course it is frequently desired in practice to displace the pH of such emulsions towards the alkaline side, hence this experiment represented a practical test of stability under such conditions.

*Example 2.*—We prepared a fatty acid amino product by condensing an alkaline decomposition product of chrome leather waste with oleyl acid chloride. We then mixed together 4 parts of the resulting 30 per cent solution of fatty acid amino product, 16 parts of technical glycerine mono stearic acid ester, 20 parts of paraffin oil and 40 parts of water, while heating slightly. An emulsion formed readily during mixing. After cooling, we then added 20 parts of a buffer solution consisting of 10.2 grams lactic acid, 30.2 grams sodium lactate and 16 grams potassium lactate per liter and having a pH of 4.5. The resulting product was found to be a smooth salve of excellent spreading properties and being stable even at elevated temperatures.

An attempt was made to prepare a similar emulsion following the procedure of the acknowledged Schrader patent. In this experiment we mixed together 16 parts of technical mono stearic acid ester, 0.9 part potassium stearate, 20 parts paraffin oil and 40 parts of water. But when the resulting emulsion was cooled and mixed with the above described buffer solution, a graining was noticeable in the emulsion and, on standing, water separated even at ordinary temperatures.

*Example 3.*—We mixed together 10 parts of lard (a fatty acid triglyceride), 88 parts of water, 5 parts of technical glycerine mono stearic acid ester and 2 parts of the 25 per cent solution of fatty acid amino product which was used in Example 1. This formed a durable liquid emulsion which was found to be stable even at 50° C.

In order to compare the emulsifying power of the combined emulsifiers of the present invention with that of the emulsifiers separately, further experiments were made. The procedure of Example 3 was followed accurately except that the 5 parts of glycerine mono stearic acid ester were omitted. It was then found impossible to form an emulsion even though the mixture was stirred vigorously both when heated and when cooled. It was found that, with 10 parts of the 25 per cent solution of fatty acid amino product, an emulsion was formed but this was found to be stable only for a short time. The glycerine mono stearic acid ester, when used alone as an emulsifier was found to be equally incapable of producing a stable emulsion from the lard and water as used in Example 3.

The above specific examples are intended merely to be illustrative of the present invention. It is obvious, of course, that many modifications can be made in the procedures described without departing from the perview of this invention. For example all types of oleaginous and other emulsifiable materials can be emulsified by the use of our novel combination of emulsifiers. Various indifferent additions may be made to the emulsions, such as mineral oils and fats, solvents of all types, vegetable and animal fats, oils, waxes, rosins, and powdered solid substances. These additional agents may be dissolved in the aqueous or the fatty phase. Substances of acid, alkaline or salt-like character may also be added owing to the inherent stability of our emulsions.

The partially esterified polyhydric alcohol-component of our emulsions may be selected from any of these compounds which are mentioned in the Schrader Patent No. 1,826,900. Any esters of the polyhydric alcohols with the higher fatty acids, in which free hydroxyl groups are present, are applicable. Simpler compounds of this type are, for example, propylene glycol mono fatty acid ester and glycerine mono- or di-ester of the cocoa nut oil fatty acids. The fatty acids may be saturated or unsaturated and any derivatives of these acids may be employed to produce the desired compounds. The fatty acids may be substituted with oxy, hydroxy, sulphonic, amino or halogen groups, for example. And the polyhydric alcohols within our invention include saturated as well as unsaturated alcohols and their derivatives, such as the condensation products of polyhydric alcohols with etheral bond, or polyhydric alcohols with ketone or aldehyde groups which are contained in sugars and the like. Di- and polyglycerols and glycols are examples of such compounds.

Other modifications of our processes and products which fall within the scope of the following claims will be immediately evident to those skilled in the art.

What we claim is:

1. In the manufacture of emulsions, the process which comprises emulsifying an aqueous liquid with at least one polyhydric alcohol, partially esterified with higher fatty acids, and with a fatty acid amino product, formed by the reaction of a fatty acid body of high molecular weight in which the acid group is the chief function with the high molecular decomposition products of an albumin; said decomposition products being of the type resulting from the treatment of albumins with acids and alkalies sufficient of said partially esterified alcohol and of said fatty acid amino product being present to produce a stable emulsion.

2. The process of claim 1 wherein said polyhydric alcohol is partially esterified with an unsaturated higher fatty acid.

3. In the manufacture of emulsions, the process which comprises dispersing a material to be emulsified in an aqueous medium by means of two substances acting conjointly as emulsifiers, one of said substances being a polyhydric alcohol partially esterified with at least one fatty acid of high molecular weight and the other of said substances being a fatty acid amino product, capable of being formed by the reaction of a fatty acid body of high molecular weight in which the acid group is the chief function with a high-molecular alkaline decomposition product of chrome leather waste containing the salts of protalbinic and lysalbinic acids.

4. In the manufacture of emulsions, the process which comprises dispersing a material to be emulsified in an aqueous medium by means of two substances acting conjointly as emulsifiers, one of said substances being a polyhydric alcohol partially esterified with at least one fatty acid of high molecular weight and the other of said substances being a fatty acid amino product, capable of being formed by the reaction of high-molecular decomposition products of an albumin; said decomposition products being of the type resulting from the treatment of albumins with acids and alkalies with an acid halide of a compound selected from a class consisting of the high molecular saturated and unsaturated fatty acids.

5. In the manufacture of emulsions, the process which comprises dispersing a material to be emulsified in an aqueous medium by means of two substances acting conjointly as emulsifiers, one of said substances being a polyhydric alcohol partially esterified with at least one fatty acid of high molecular weight and the other of said substances being a fatty acid amino product; said fatty acid amino product being the reaction product of a high molecular fatty acid body in which the acid group is the chief function with the high-molecular acid-decomposition products of an albumin of the type of protalbinic and lysalbinic acids.

6. In the manufacture of emulsions, the process which comprises dispersing a material to be emulsified in an aqueous medium by means of two substances acting conjointly as emulsifiers, one of said substances being a polyhydric alcohol partially esterified with at least one fatty acid of high molecular weight and the other of said substances being a fatty acid amino product; said fatty acid amino product being the reaction product of the high-molecular alkaline-decomposition product of an albumin; said decomposition products being of the type resulting from the treatment of albumins with acids and alkalies with a fatty acid body of high molecular weight selected from a class consisting of the high-molecular saturated and unsaturated fatty acids, the acid halides and the acid anhydrides of said fatty acids.

7. As a new emulsifier, the combination of at least one polyhydric alcohol, partially esterified with higher fatty acids, and a fatty acid amino product, formed by the reaction of a fatty acid body of high molecular weight in which the acid group is the chief function with the high-molecular decomposition products of an albumin; said decomposition products being of the type resulting from the treatment of albumins with acids and alkalies.

8. An aqueous emulsion comprising two emulsifiers in combination, one of said emulsifiers being a polyhydric alcohol partially esterified with higher fatty acids and the other being a fatty acid amino product, capable of being formed by the reaction of a fatty acid body of high molecular weight in which the acid group is the chief function with the high molecular decomposition products of an albumin; said decomposition products being of the type resulting from the treatment of albumins with acids and alkalies.

9. An oleaginous emulsion with an aqueous continuous phase containing, as emulsifiers, the combination of a polyhydric alcohol partially esterified with higher fatty acids and a fatty acid amino product, formed by the reaction of a fatty acid body of high molecular weight in which the acid group is the chief function with the high-molecular decomposition products of an albumin; said decomposition products being of the type resulting from the treatment of albumins with acids and alkalies; said emulsions being characterized by being stable over a wide range of pH values, being highly stable upon change of temperature, upon the addition of electrolytes and upon dilution, and being physiologically inert.

10. As a new composition of matter, an emulsion comprising an aqueous phase, polyhydric alcohols partially esterified with acids selected from a class consisting of saturated and unsaturated fatty acids of high molecular weight, and also containing a fatty acid amino product, capable of being formed by the reaction of the high-molecular decomposition products of albumins; said decomposition products being of the type resulting from the treatment of albumins with acids and alkalies with fatty acid bodies selected from a class consisting of high molecular saturated and unsaturated fatty acids, the acid halides of said fatty acids and the anhydrides of said fatty acids.

11. As a new composition of matter an emulsion comprising an aqueous phase, polyhydric alcohols partially esterified with fatty acids of high molecular weight and also containing a fatty acid amino product, formed by the reaction of a high-molecular fatty body in which the acid group is the chief function with the alkaline decomposition product of chrome leather waste containing the salts of protalbinic and lysalbinic acids.

12. As a new composition of matter, an emulsion comprising an oleaginous material dispersed in an aqueous medium and containing, as emulsifiers a polyhydric alcohol partially esterified with a compound, selected from a class consisting of the saturated and unsaturated fatty acids of high molecular weight, and a fatty acid amino product, capable of being formed by the reaction of the decomposition products of an albumin; said decomposition products being of the type resulting from the treatment of albumins with acids and alkalies with a fatty acid body selected from a class consisting of the high molecular saturated and unsaturated fatty acids, the acid halides and the acid anhydrides of said fatty acids.

13. The composition of claim 8 wherein the decomposition product is an acid decomposition product.

14. The composition of claim 8 wherein the decomposition product is an alkaline decomposition product.

HANS SCHRADER.
HERBERT STAHL.